United States Patent [19]

Osborn et al.

[11] Patent Number: 4,922,618
[45] Date of Patent: May 8, 1990

[54] POLAR CO-ORDINATE DIGITIZER

[76] Inventors: John J. Osborn; Edgar M. Litzaw, both of 65 Koch Rd., Corte Madera, Calif. 94925

[21] Appl. No.: 286,462

[22] Filed: Dec. 19, 1988

[51] Int. Cl.⁵ .................................................. G01B 3/00
[52] U.S. Cl. .................................................. 33/1 MP
[58] Field of Search ................. 33/1 PT, 1 MP, 1 M, 33/1 CC, 763, 762, 756

[56] References Cited

U.S. PATENT DOCUMENTS

| | | | |
|---|---|---|---|
| 3,832,781 | 9/1974 | Flagge | 33/1 M X |
| 4,506,336 | 3/1985 | Hird | 33/1 M X |
| 4,813,146 | 3/1989 | Jaluzot | 33/1 PT |

Primary Examiner—Harry N. Haroian
Attorney, Agent, or Firm—Flehr, Hohbach, Test, Albritton & Herbert

[57] ABSTRACT

An improved polar co-ordinate digitizer where a cord extensible from a base unit moves a cord guide to provide an angle measurement and is wrapped on a drum whose movement reflects a length measurement. Lateral pressure on the cord guide is minimized by a low mass pivot arm whose angle is sensed by optical photodetector techniques. In addition the length of the cord is also sensed by a similar photodetector both mounted for rotation about the origin axis of the polar co-ordinate system and utilizing a fixed reference photodetector all of which sense a continuously rotating disk with an index mark on it. Suitable calibration is provided for the system.

10 Claims, 5 Drawing Sheets

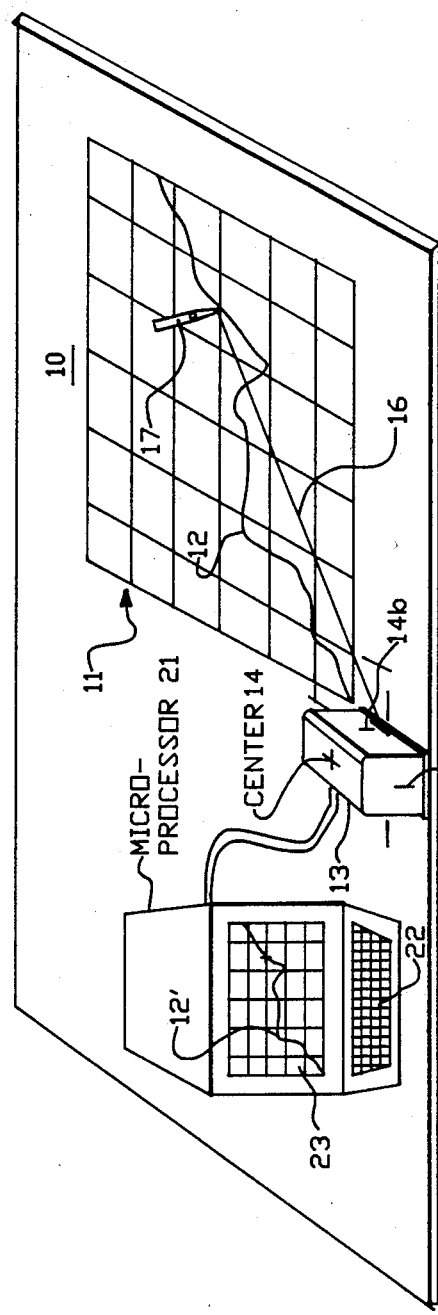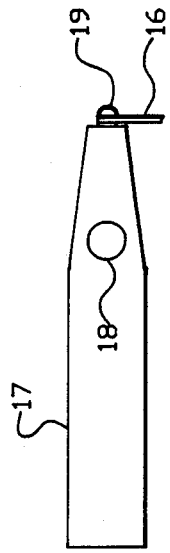

POLAR CO-ORDINATE DIGITIZER

The present invention is directed to a polar coordinate digitizer and more specifically to a system for digitizing angle and length parameters of a planar form being traced by a stylus.

BACKGROUND OF THE INVENTION

Polar co-ordinate digitizers are useful for digitizing two dimensional forms because of their simplicity. The form is traced by a stylus which is connected by a cord to a relatively fixed base support at the origin axis of the polar coordinate system. The stylus is extensible from the base support to provide the length parameter, and a cord guide through which the cord extends and is pivoted at the origin and movable by lateral pressure of the cord provides the angle parameter. Such a system is disclosed in U.S. Pat. Nos. 3,832,781 and 4,500,749.

In the system as above, features such as accuracy, simplicity and small size are all desirable. For example, the lateral pressure of the cord provides the angle parameter and thus it is desirable to minimize this pressure for the sake of accuracy.

OBJECT AND SUMMARY OF INVENTION

Therefore it is a general object of the present invention to provide an improved polar co-ordinate digitizer.

In accordance with the above object, there is provided a polar co-ordinate digitizer for digitizing angle and length parameters of a planar form being traced by a stylus using a relatively fixed base support at the origin axis of the polar co-ordinate system of the digitizer. The system includes a cord connected to the stylus extensible from the base support for providing the length parameter and a cord guide through which the cord extends and is pivoted substantially at the origin, movable by the lateral pressure of the cord to provide the angle parameter. The improvement comprises a continuously rotating disk with its center of rotation at the origin axis and carrying means for providing an index mark. A fixed reference photodetector senses the index mark. An angle photodetector mounted on the cord guide and a length photodetector coupled to the cord are both pivoted at the origin axis and their rotary positions are indicative of the angle and length parameters, respectively. Means are provided for sensing elapsed time between the reference photodetector sensing the index mark and the length and angle photodetectors sensing the index mark for providing digital data representing said angle and length parameters.

BRIEF DESCRIPTION OF DRAWINGS

FIG. 1 is a perspective view of the digitizer of the present invention showing the stylus tracing a planar form.

FIG. 2 is a plan view of the stylus.

DETAILED DESCRIPTION OF PREFERRED EMBODIMENTS

Figure 3:
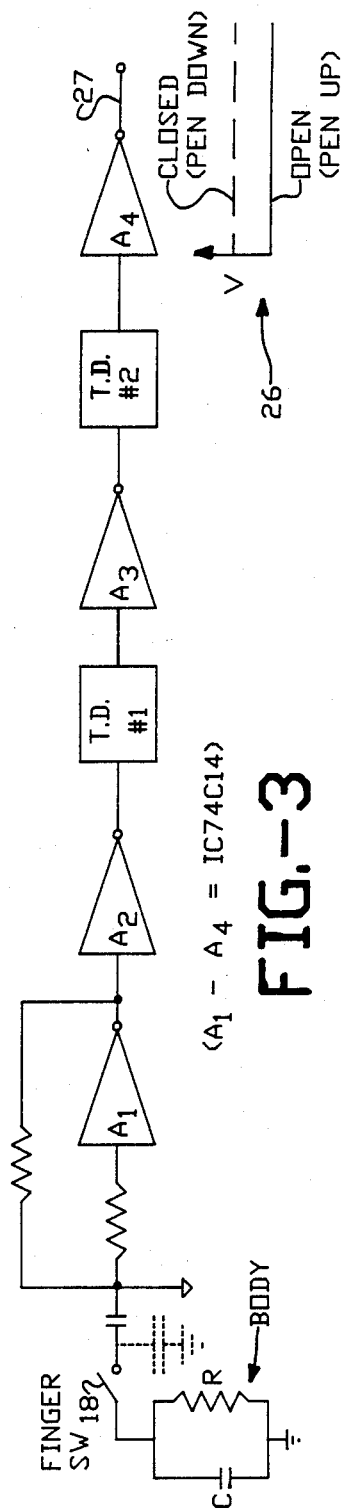
FIG. 3 is a circuit schematic used in the present invention.

FIG. 1 illustrates the practical application of the invention where on a drafting board 10 having a rectangular co-ordinate system 11 there is a curve 12 representing some function. A polar co-ordinate digitizer 13 is also placed on the board in a predetermined location with respect to the rectangular co-ordinate system 11 as determined by the center 14 of the polar co-ordinate digitizer and associated alignment markings 14a, 14b which may be aligned with proper markings on the drafting board 10. Thus this provides an origin, or more specifically an origin axis of the polar co-ordinate system of the digitizer which provides length and angle parameters of an extensible cord 16 which is pulled from the digitizer and guided on the curve 12 by an attached stylus 17. FIG. 2 shows the stylus 17 in greater detail connected to the cord 16 with the stylus also having a manually operated pushbutton 18 which provides the well-known pen up-down function by an inner conductor (not shown). The point of the stylus 19 is guided by the user on a course along the curve 12.

Referring back to FIG. 1, in use digitizer 13 is connected to a microprocessor 21 which has a keyboard input 22 along with a video display 23 which as illustrated has replicated the curve 12 and is illustrated as 12'.

The circuit diagram of FIG. 3 which is contained in the digitizer 13 shows the details of the pen up-down finger switch 18 which, when the finger switch is closed by actuation of the user as shown by the graph at 26, a voltage output occurs at the terminal 27 connected to the inner conductor to show pen down; similarly with the switch open, the voltage is substantially at a lower ground level. The circuit in essence utilizes four Schmidt inverters designated $A_1$ through $A_4$ which may be obtained commercially as an IC74C14. Inverter $A_1$ is connected as effectively a type of regenerative comparator which operates at, for example, a 10 kHz nominal frequency with approximately a 50% dc component. Its input is the stray capacitance, designated $C_{ST}$, of the cord and the circuit in general; and then when switch 18 is closed the resistance and capacitance of the human body. This addition to the input causes a switch in the output of the inverter $A_1$ which is sharpened by inverter $A_2$ and then through two time delay units T.D. #1 and T.D. #2 and the two other inverters a relatively sharp binary change is provided as illustrated to one of the two levels as indicated at 26. The foregoing is all accomplished by the use of a single electrical conductor for performing the pen up-down function.

Referring briefly back to FIG. 1, the foregoing is important since the cord 16 should be a light and flexible as possible. Accordingly, the ideal form of the cord is a cord of the tinsel type where the conductor is wound around a nylon or Dacron cord. Such a cord is available from, for example, Cooner Wire of Chatsworth, Calif., under the trademark Ultraflexible Wire.

Figure 5:
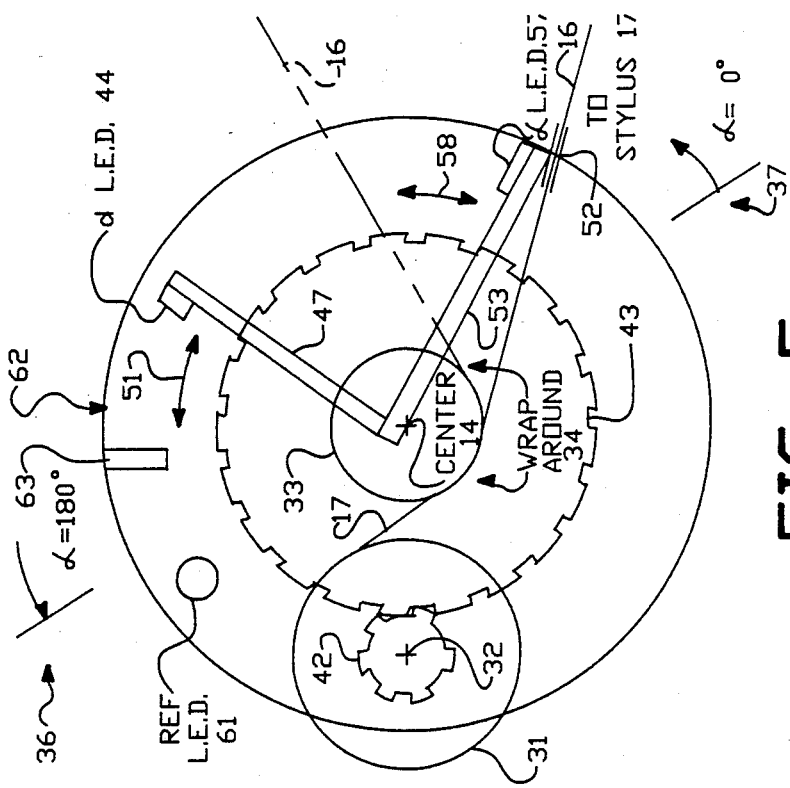
FIG. 5 is a simplified cross-sectional view of a portion of FIG. 4.
Figure 4:
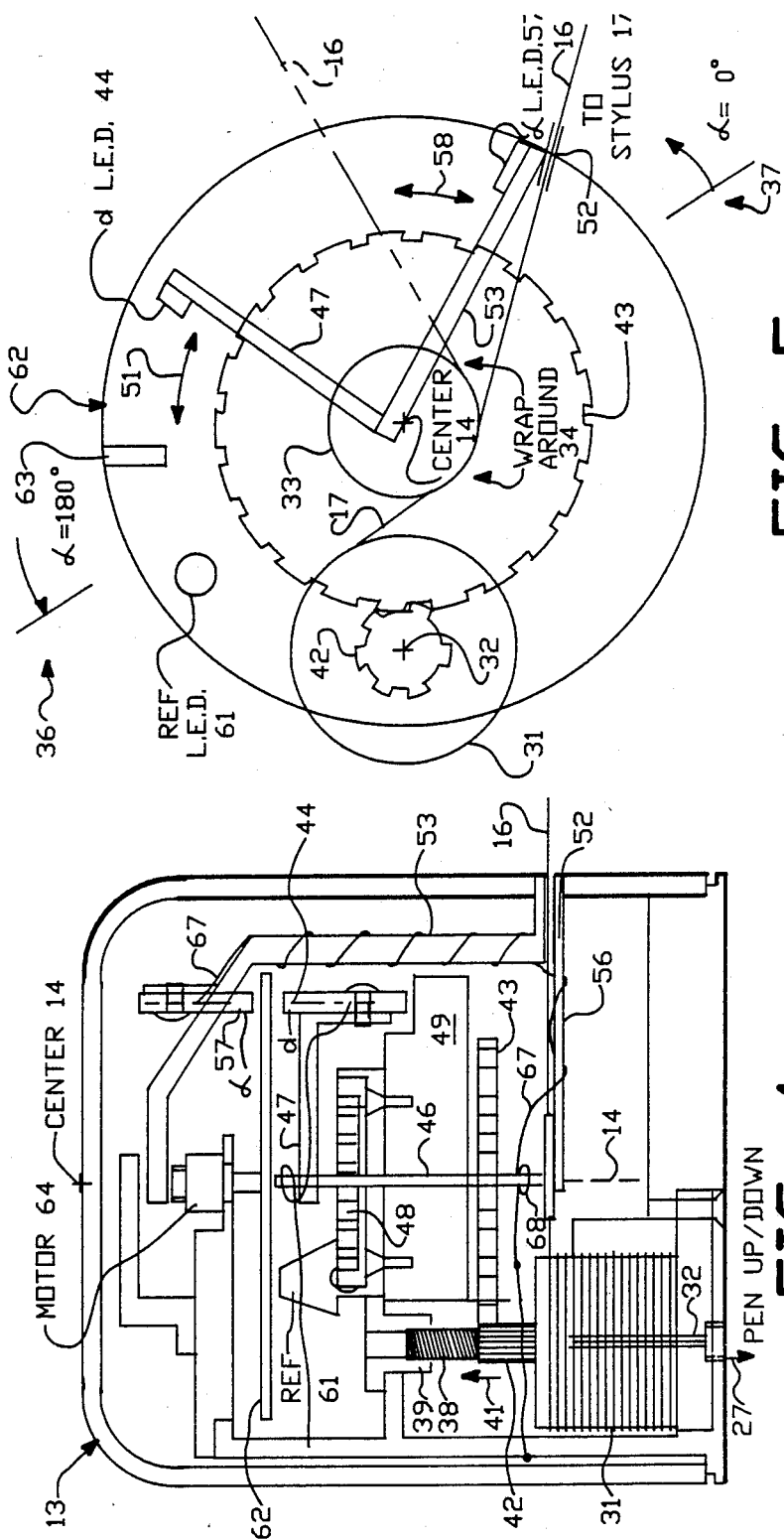
FIG. 4 is a cross-sectional view of a digitizer unit shown in FIG. 1.

FIGS. 4 and 5 show the full details of the technique for measuring the angle α and length or distance d of the cord 16. Cord 16 is wrapped with several turns on a winding drum 31 which, as is apparent from FIG. 5, is rotatable on an axis 32 offset from the origin axis or center 14. Cord 17 unreeled or unwrapped from drum 31, is led around an idler pulley 33 and partially wrapped around it at 34 as illustrated. The angle α which the cord takes determines the extent of this wraparound. An idler pulley is necessary, since although ideally the string should pass exactly through the origin of the polar co-ordinate system, namely axis or center 14, too sharp an angle would be formed when the α angle approaches, for example, 180° as illustrated at 36. Note also that the nominal initial starting point of the angle of cord 16 as shown at 37 as α=0°. This wraparound 34 is compensated in software as will be discussed below.

Referring now back to FIG. 4, vertical movement of the drum 31 along its axis 32 provides an effective "level wind" for cord 16 as accomplished by the screw 38 which is threaded in collar 39. As the drum is wound, movement occurs as indicated by arrow 41 for as much as a one-half inch distance. As cord 16 is unwound from drum 31, the gear 42 rotatable with the drum drives the larger gear 43 rotatable around the axis 14 to rotate via a shaft 46 a length or distance light emitting diode 44. Note the gear ratio of gears 42 and 43 as more clearly shown in FIG. 5 where, for example, gear 42 may have 15 teeth and gear 43, 198 teeth. This means that the LED 44 which is mounted on the arm 47 connected to shaft 46 will move less than one revolution for several revolutions of drum 31. This is essential for the time lapse type measuring function as will be discussed below. The winding drum 31 is spring loaded by means of the spring 48 connected to shaft 46 which is tied to the weight and bearing 49.

Thus to summarize the determination of the length parameter, the length that cord 16 has been extended is determined by the angular position of light emitting diode 44 which moves in a circle as shown at 51 (FIG. 5). Therefore, measurement of the angular position would yield length information.

To provide the angle parameter of cord 16, the cord is passed through a cord guide 52 which moves when it senses a lateral pressure of cord 16. The guide is a part of a low mass U-shaped arm 53 which is pivoted at axis 14 and has a upper leg 54 and a lower leg 56. A light emitting diode angle photodetector 57 is mounted on upper arm 54 and the cord guide 52 is a portion of lower leg 56. The ends of legs 54 and 56 are mounted by low friction bearings to pivot at the origin axis or center 14.

Thus in a manner similar to the distance measurement LED 44, the angle LED 57 rotates in a direction shown by the arrow 58 and its rotary position is indicative of the angle of cord 16. And as has been explained before, the angle nominally starts at 0° at 37 and extends to 180° at 36 as illustrated in FIG. 5.

To provide a measurement of these two angles, there is provided a fixed reference point (another LED) as shown at 61. This is mounted on the weight end bearing unit 49. All LED units 61, 57 and 44 face a black spinning or rotating disk 62 which has on its periphery on both sides a reflective index mark 63. The disk 62 is rotated by motor 64 at approximately 1,400 rpm, which speed is not critical. Each time index mark 63 passes by one of the LED units, this is detected. Thus the passage of time between the reference LED 61 and the distance and angle LED's 44 and 57 is indicative of their angular relationship and ultimately determines the desired length and distance parameters.

Figure 9:
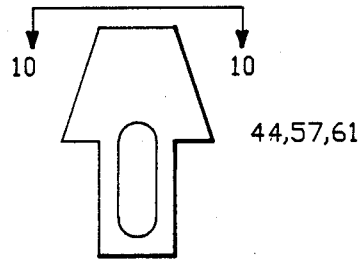
FIG. 9 is an elevation view of a photodetector portion of FIG. 4.
Figure 10:
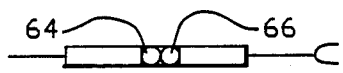
FIG. 10 is a view taken substantially along the line 10—10 of FIG. 9.

FIGS. 9 and 10 illustrate all of the LED units 44, 57 and 61. They are actually, as shown in FIG. 10, in addition to a light emitting diode 64, they include a photodetector 66 so that when the reflective index mark 63 passes by, the light emitted by the LED is reflected and sensed by the photodetector 66. Any other type of frictionless detector could be used.

In order to reduce the lateral pressure on cord 16 as it is being moved to a new angle as has been discussed above, the arm 53 is made as light a mass as possible. However, in order to power the photodetector LED system 57, an electrical cord 67 must be provided which minimally includes three wires, a common and one each for the LED 64 and photodetector 66 (see FIG. 10). Thus to minimize lateral pressure, wire 67 as illustrated in FIG. 4 is wrapped in a spiral 68 around axis 14. This is shown in greater detail in FIG. 6. Such spiral minimizes the force of the wire tending to restrict rotary movement. Wire 67 is of course attached at some fixed location 69.

Figure 6:
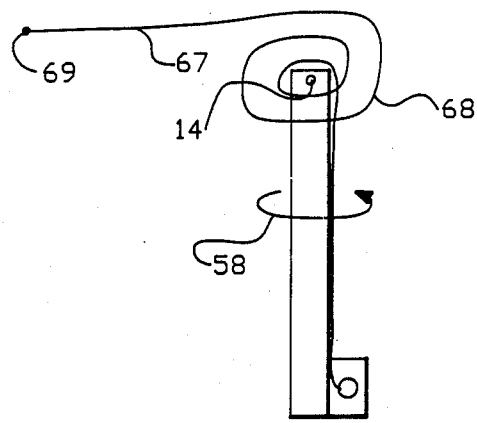
FIG. 6 is a fragmentary representation of an angle measuring arm shown in FIG. 4.
Figure 7:
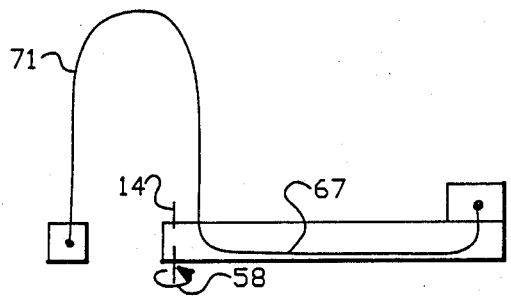
FIG. 7 is an alternative embodiment of the representation of FIG. 6.

As an alternative to the spiral wrapping of FIG. 6, the wire 67' can also be placed in a large loop 71 in the direction of axis 14.

Figure 8:
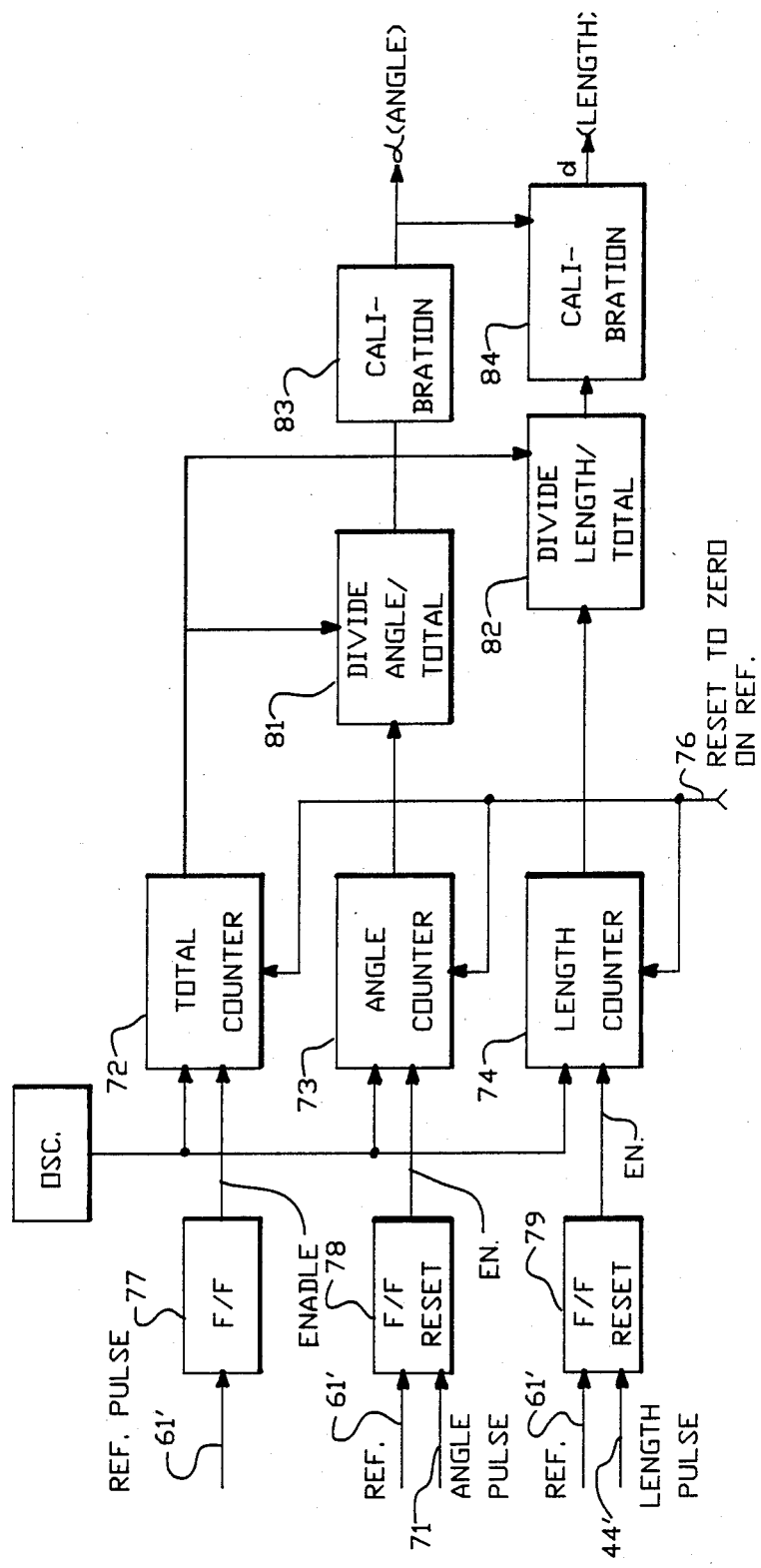
FIG. 8 is a block diagram useful in understanding the operation of the present invention.

Now specifically referring to the time lapse angle measurement system, FIG. 8 in block diagram form represents the processing of the various pulses from the photodetectors for reference angle and distance, which are of course in response to passage of the index mark of the rotating disk past the respective photodetector after it is illuminated by the associated light emitting diode. FIG. 8 shows in a digital circuitry form the processing technique; however, in actual practice this could be regarded as a flow chart representing the functioning of microprocessor 21 of FIG. 1.

The three inputs alluded to above are, of course, a reference pulse 61', an angle pulse 57' and a length pulse 44'. Three counters 72, 73 and 74 are present; total counter 72 counts for the total duration of the revolution of disk 62 (see FIG. 5) with the angle counter 73 having a count representative of the angular location of the angle photodiode 57 with respect to the reference and similarly the length counter 74 containing a count representative of the angular location with respect to the reference of the length or distance LED 44.

Each time that the reference marker passes the reference photodetector LED system 61, there is a reset to zero of all counters as indicated on the line 76. At the same time the reference pulse 61' through the flip flops 77, 78 and 79 enable the counter to start them counting. Counter 72 counts the duration of one revolution of the disk. Angle counter 73 is turned off by the reset input of the angle pulse 57' to flip flop 78; similarly length counter 74 registers the duration of the revolution between the fixed LED and the length LED and is then turned off by the length pulse input 44' with resets flip flop 79. Thus in summary, at the end of one complete revolution of the disk just before they are rezeroed, counter 72 represents the count for a complete revolution of the disk, counter 73 the angle measurement and counter 74 the distance measurement. In order to eliminate the speed of the disk to provide an absolute angle measurement, in unit 81 the angle count is divided by the total; similarly in divider 82 the length count is divided by the total. After suitable calibration in units 83 and 84, these give an actual digital representation of the angle α and length d parameters. Calibration might include multiplying the results of the division at 81 and 82 by 360°, for example.

From the foregoing it is apparent that because of the common axis for the time lapse measurement in which the angle and length photodetectors are rotated about the same origin axis as the reference photodetector utilizes, the apparatus is highly compact but yet efficient in that errors are minimized. Also the use of the common reference marker for both angle and length minimizes errors.

Calibration and Measurement of Angle and Length

To calibrate the angle or α measurement the following steps are carried out. These are commonly done at the factory site, but the user may repeat the process to recalibrate if necessary.

Figure 12:
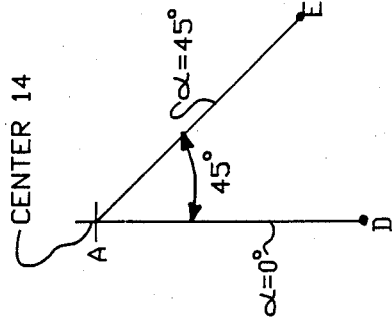
FIG. 12 is a diagram useful in understanding the determination of the angle parameter of the present invention.

(1) Referring to FIG. 12, center 14 of the polar coordinate system has been designated A. A point D is chosen for α=0° and then a point E at 45°. The lengths AD and AE are made equal for later use in distance correction.

(2) Measurement is made at the points D and E for both the angle and length. These are designated as $T_\alpha D$ and $T_\alpha E$ for angle; and $T_d D$ and $T_d E$ for distance. Note that these values would normally be produced by the output of angle and length units 81 and 82 of FIG. 8.

(3) Therefore $T_\alpha D - T_\alpha E/45$ = Time per degree of angle (this is a calibration constant which can be used for all future measurements).

(4) So $\alpha x = 45/T_\alpha D - T_\alpha E \cdot (T_\alpha D - T\alpha x)$.

DISTANCE CALIBRATION AND MEASUREMENT

I. Wrap Around Correction

As discussed above, in conjunction with FIG. 5 the wrap around of the cord 16 on idler pulley 33 causes a variation of length for which a correction factor must be applied. However, this is a constant correction per degree and from step 2 above is $$dc = \frac{T\alpha D - T\alpha E}{45}$$

II. To find the actual length of cord or the distance and referring to FIG. 11, the center or $T_0$ location is, of course, physically unavailable. It is in theory where the cord would have zero length. However, it is necessary to know the actual point A or the origin, since this is the origin of the overall polar co-ordinate system. Thus the following calibration steps are utilized.

Figure 11:
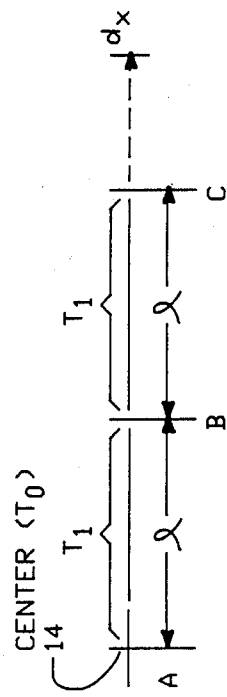
FIG. 11 is a diagram useful in understanding the determination of the length parameter of the present invention.

(1) Still referring to FIG. 11, point A is regarded as the center of origin 14 and the distances AB and BC are both equal to 1.

(2) Measurements $T_d C$ and $T_d B$ are conducted. Therefore $T_1$ (which is actually the difference between the angle measured at one point and that at another which reflects distance) is the following: $T_1 = T_d C - T_d B$. Therefore by inspection $T_0$ is equal to $T_d B - T_1$. The above provides the particular digital count representing the origin or point A or the point.

(3) $T_1/d$ = time for each unit of distance.

(4) $d_x = T_d X - T_0/T_1/d$

Here $T_1/d$ is another calibration constant. It should in theory stay constant for the life of the digitizer device but can be recalculated due to stretching of the cord if necessary.

(5) $d_{true} = d_x + dc\, (\alpha x)$ where dc has been precalculated above.

Thus the foregoing shows how the wrap around which is created by the idler pulley and which is necessary so that too sharp an angle is not created to thereby increase forces undesirably is compensated for.

In summary, an improved polar cord digitizer has been provided which is compact, efficient and accurate since lateral pressure has been significantly reduced. The use of time lapse in the context of the present invention optimizes efficiency and compactness. Of course, to translate the polar coordinates to cartesian, all that need be done is a multiplication of the distance or length measurement by proper cosine and sine functions of the angle measurement.

What is claimed is:

1. A polar co-ordinate digitizer for digitizing angle and length parameters of a planar form being traced by a stylus using a relatively fixed base port at the origin axis of the polar co-ordinate system of the digitizer, the system comprising a cord connected to the stylus extensible from the base support for providing said length parameter and a cord guide through which said cord extends and is pivoted substantially, at said origin movable by lateral pressure of said cord to provide said angle parameter, the improvement comprising:

a continuously rotating disk with its center of rotation at said origin axis, and carrying means for providing an index mark;

a fixed reference photodetector for sensing said index mark;

an angle photodetector mounted for movement with said cord guide and a length photodetector coupled to said cord both pivoted at said origin axis whose rotary positions are indicative of said angle and length parameters, respectively;

means for sensing elapsed time between said reference photodetector sensing said index mark and said length and angle photodetectors sensing said index mark for providing digital data representing said angle and length parameters.

2. A digitizer as in claim 1 where said cord is wrapped on a drum including axial means on which said drum is mounted for providing a level wind.

3. A digitizer as in claim 2 where said axial means includes a screw which moves said drum in an axial direction during winding.

4. A digitizer as in claim 1 including electrical leads extending from a fixed point to said angle photodetector, said electrical leads being wrapped in a spiral coil around said origin axis to minimize lateral pressure.

5. A digitizer as in claim 1 where said cord is of a tinsel type where a conductor is wrapped around a base core.

6. A digitizer as in claim 1 where said cord consists of a single electrical conductor for performing a pen up/down function.

7. A digitizer as in claim 1 where said cord is wrapped on a drum which is rotatable on an axis offset from said origin but coupled to a gear rotatable about said origin axis to drive said length photodetector.

8. A digitizer as in claim 7 where said cord is partially wrapped on an idler pulley rotatable around said origin axis.

9. A digitizer as in claim 8 where the amount of wrap on said idler pulley varies with said angle parameter and including means for correcting said length parameter in accordance with said wrap and said variation of angle.

10. A digitizer as in claim 1 including a U-shaped arm pivoted at the ends of the legs of the U for free rotation at said origin axis and carrying said cord guide on one leg and said angle photodetector on said other leg.

* * * * *